United States Patent [19]
Dow et al.

[11] Patent Number: 5,913,589
[45] Date of Patent: Jun. 22, 1999

[54] COMBINATION PRODUCT COOLING AND FLUX MANAGEMENT APPARATUS

[75] Inventors: Stephen J. Dow, Epping; Robert S. Silveri, Manchester; Omer Kerem Durdag, Portsmouth; Thomas A. Sherwin, Newfields; Mark O. Beaupre, Seabrook, all of N.H.

[73] Assignee: Conceptronics, Inc., Portsmouth, N.H.

[21] Appl. No.: 09/195,980

[22] Filed: Nov. 19, 1998

Related U.S. Application Data

[62] Division of application No. 08/805,177, Feb. 26, 1997.

[51] Int. Cl.[6] ...................................................... F26B 7/00
[52] U.S. Cl. ................................. 34/378; 34/379; 34/417; 34/469
[58] Field of Search .............................. 34/378, 379, 417, 34/429, 74, 75, 76, 77, 131, 202, 219; 228/42, 46, 219, 231

[56] References Cited

U.S. PATENT DOCUMENTS

| | | | |
|---|---|---|---|
| 4,996,781 | 3/1991 | Mishina et al. | 34/77 |
| 5,007,179 | 4/1991 | Rodgers, Sr. et al. | 34/443 |
| 5,611,476 | 3/1997 | Soderlund et al. | 228/42 |
| 5,641,341 | 6/1997 | Heller et al. | 228/46 X |

Primary Examiner—Henry Bennett
Assistant Examiner—Steve Gravini
Attorney, Agent, or Firm—Iandiorio & Teska

[57] ABSTRACT

A combination product cooling and flux management apparatus is mounted above a reflow soldering oven. The apparatus has a sealed housing with four openings: an ambient air inlet, an ambient air outlet, a recirculating gas inlet and a recirculating gas outlet. The recirculating gas blower is mounted in a first end of the housing and draws air into the recirculating gas inlet, through a recirculating gas side of a gas-to-gas heat exchanger and out the recirculating gas outlet, where it is recirculated through a product cooling chamber and back into the recirculating gas inlet. The ambient air blower is mounted in a second end of the housing and draws air into the ambient air inlet, through an ambient air side of the gas-to-gas heat exchanger and out the ambient air outlet to the surrounding atmosphere. The gas-to-gas heat exchanger is mounted between the blowers within the housing and has a pleated serpentine heat transfer surface, which are vertically oriented and define a bottomless recirculating gas side of the heat exchanger. Heat exchanger endplates, combined with the pleated heat exchanger surface define a sealed barrier between the recirculating gas and the ambient air. The pleated surface serves as a common wall between the gas flows and cools the recirculating gas to a temperature where the flux entrapped in the recirculating gas condenses on the pleated surface and drips into a drip collector plate mounted below the heat exchanger.

5 Claims, 2 Drawing Sheets

COMBINATION PRODUCT COOLING AND FLUX MANAGEMENT APPARATUS

This is a division of application Ser. No. 08/805,177, filed Feb. 26, 1997.

BACKGROUND OF THE INVENTION

Reflow soldering is used in the surface mount industries to affix electronic components onto the surface of a printed circuit board. Solder paste is first applied to the printed circuit board ("PCB"), components are then positioned on the PCB and, the printed circuit board is heated in a convectorized oven to allow the solder to liquify and come into contact with the electronic components leads and the printed circuit board lead areas. The printed circuit board is then cooled forming an electrical connection between the components and the board.

The solder paste is comprised of a metal alloy to form the electrical connection and a flux. During the reflow soldering process, traditional solder fluxes remain on the printed circuit board and must be cleaned off at a later point usually using a solvent such as organic compounds such as water or flourochlorocarbons. These materials cause waste handling concerns.

Recently, no clean, low residue soldering materials have begun to be used in the reflow soldering industry. These no clean, low residue solders require no cleaning step of the printed circuit board because they are designed to emit their flux residues, rather than have them remain on the board. Because of this nature of no clean fluxes, reflow ovens have a great deal of contaminates to deal with in their interiors. It is important that the buildup of these materials does not hinder thermal performance.

In addition, many low residue, no clean fluxes require the addition of inert gases into the atmosphere of the reflow ovens. Thus, any system designed to manage contaminates in a reflow oven atmosphere with added inert gas must take this special atmosphere into account and preserve the atmosphere of the oven as much as possible.

An additional problem of no clean flux use is that in the cooling chamber portion of the reflow oven, flux emitted into the furnace atmosphere tends to condense very quickly onto their cool surfaces. The condensation of such flux byproducts onto a traditional cooling apparatus within the reflow oven will result, over time, in the erosion of cooling performance. This, in turn, can cause solder joint reliability problems within the soldered article because of the lengthened cooling time. In order to prevent buildup in currently used cooling systems, extensive maintenance is required to constantly remove the flux condensate form the walls of the system. This is undesirable.

Present cooling systems in reflow ovens may incorporate filtration alone or a "high temperature" vaporization method to help remove flux byproducts. Unfortunately, filters only move the problem from one location to another. Flow levels still fall off and heat exchangers still clog. In addition, vaporization systems have limited value since the flux byproducts tend to contaminate the oven chamber and soldered articles with deleterious conductive carbon residues or short-chain organic greases. They also can damage cooling apparatus components, and these burnoff systems reduce cooling since the high temperatures required render heat exchangers useless. Filter systems also reduce cooling efficiency by restricting air flow in the cooling systems as the filter become filled with flux byproduct, and they require continual and extensive maintenance and monitoring to maintain correct convection flows.

One cooling system, "Cooling and Exhaust Unit for Solder Reflow System", U.S. Pat. No. 4,912,857, by Parent, et. al., is disclosed to cool and exhaust gases from the cooling zone of a reflow soldering machine. The system blows cool external, ambient air onto the printed circuit boards and exhausts gases and fumes out of the system in a balanced fashion. Such a system does not recirculate the atmosphere air of the oven and does not clean flux byproduct from the atmosphere air prior to exhaust. Some form of stack "collection" is necessary for the removal of flux byproducts and to minimize flux emissions.

An apparatus is needed to remove aerosol flux byproducts from the process gas of reflow ovens. Such an apparatus should remove the aerosol byproducts internally without the need for external stack cleaning systems and without incineration. An apparatus is needed that will clean flux byproducts without harming cooling efficiency of the apparatus over time. An apparatus is needed that will not require a great deal of maintenance or troubleshooting. An apparatus is needed whereby maintenance and cleaning can be done without causing any significant delay in continuous reflow oven production operations.

SUMMARY OF THE INVENTION

The present invention is a combination product cooling and flux management apparatus for the removal of flux from the recirculating gas of a reflow soldering oven arranged above a conveyer in such a solder reflow oven. The apparatus comprises a sealed housing, in which is mounted an ambient air blower, a recirculating air blower, one or more drip collector plates, and one or more heat exchangers. The ambient air blower creates an ambient air path along an ambient air side of the heat exchanger surface, while the recirculating air blower creates a recirculating gas path along a recirculating gas side of the heat exchanger. The heat exchanger has a single serpentine pleated surface that, in combination with endplates, defines a seal between the two air flow paths. The pleated arrangement of the bottomless heat exchanger forms a surface upon which the flux collects and falls onto at least one drip collector plate, thus facilitating removal of flux from the recirculating air to collection surfaces below while maintaining desired recirculating gas oxygen levels, flow levels and temperature.

The present invention fills the need for a system to remove flux byproducts from recirculating gas through the use of the open bottomed heat exchanger to condense and drop off flux byproducts onto the drip pan. Maintenance is simplified through cleaning of the flux byproduct by removal of the drip pan. The heat exchanger may be replaced with a spare heat exchanger to eliminate long downtimes associated with cleaning heat exchangers. The wide pleats on the heat exchanger eliminate clogged and inefficient cooling of atmosphere gas.

DETAILED DESCRIPTION OF THE INVENTION

Figure 1:
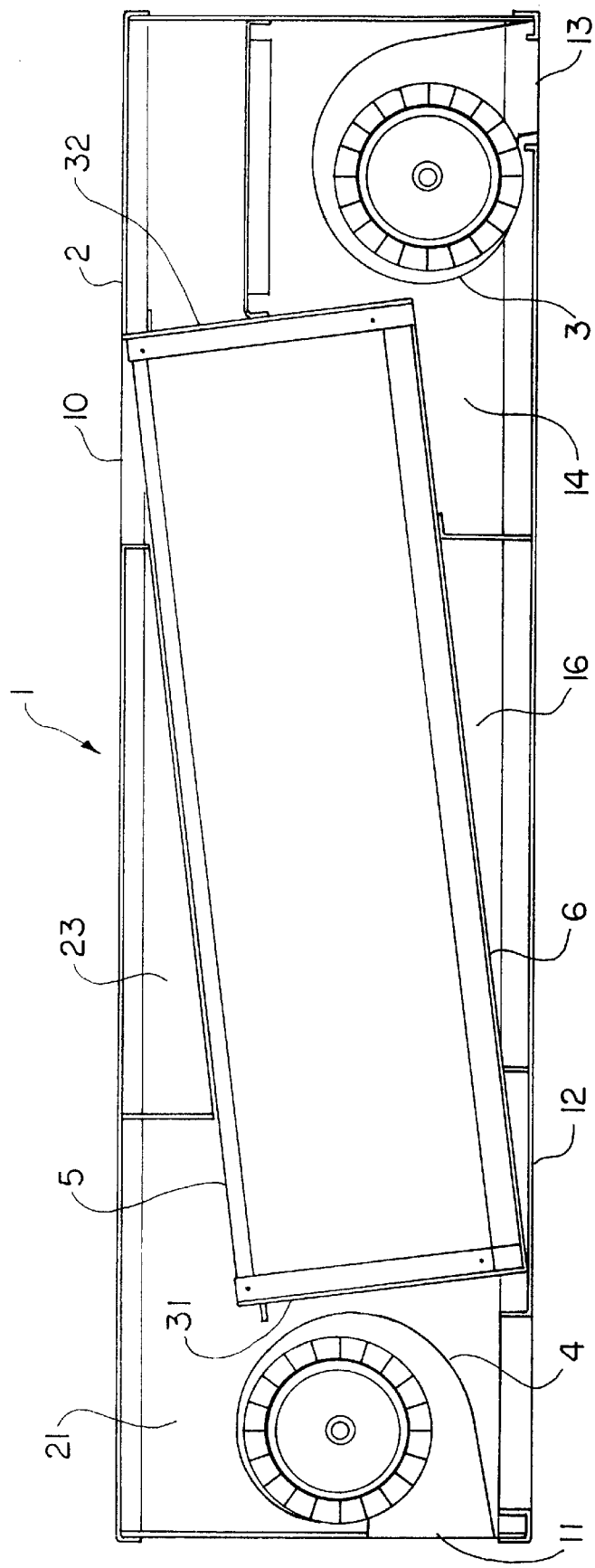
FIG. 1 shows a side view of one embodiment of the invention.
Figure 2:
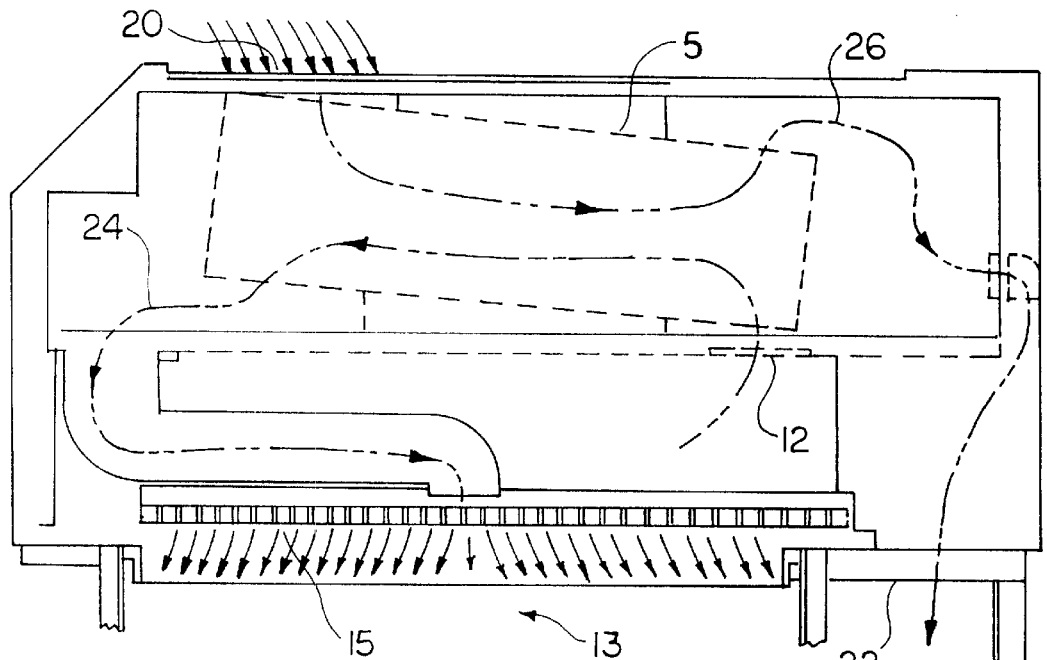
FIG. 2 shows an a view of an embodiment of the invention showing the recirculating gas and ambient air flow paths.
Figure 3:
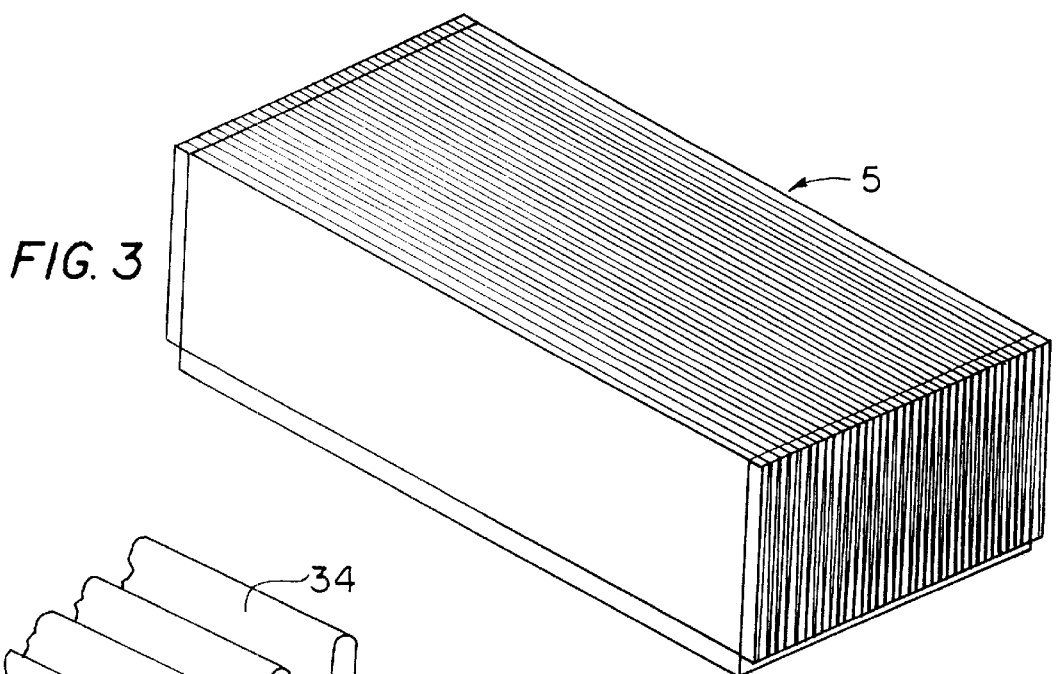
FIG. 3 shows a perspective view of the assembled pleated heat exchanger.
Figure 4:
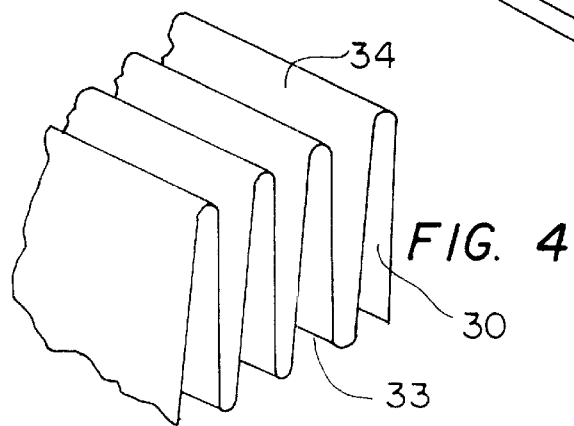
FIG. 4 shows a partial cutaway view of the pleated heat exchanger.

Turning now to the figures, a combination product cooling and flux management apparatus 1 for a reflow soldering oven is shown. The combination product cooling, flux management apparatus 1 comprises a sealed housing 2, a recirculating gas blower 3, an ambient air blower 4, at least one heat exchanger 5, and a drip collector plate 6. The housing 2 holds all elements of the apparatus and is sealed with the exception of an ambient air inlet 10, an ambient air outlet 11, a recirculating gas inlet 12, and a recirculating gas outlet 13.

In the preferred embodiment of the invention, the housing 2 is substantially rectangular in shape. The housing is aligned transversely across a conveyer (not shown) which carries printed circuit boards through the main heating chamber of a reflow soldering oven and through the combination product cooling and flux management apparatus 1. The transverse orientation optimizes the total surface area of the heat exchanger 5 and allows for the directing of opposing but non-intermixing flows of ambient air and recirculating, cooling chamber gas. The housing 2 is preferably mounted above the conveyer in order to clean and cool the recirculating gas used within the oven.

The recirculating gas may be air, nitrogen or a nitrogen-enriched gas mixture. Alternatively, any inert gas-enriched atmosphere would be effective. The housing should be made of a non-corrosive material, such as aluminum, stainless steel or the like, to withstand the corrosive fumes that are entrapped by the recirculating gas as it passes through the product cooling chamber 13. The housing must be large enough to hold the heat exchanger 5, recirculating gas blower 3 and ambient air blower 4. The recirculating gas blower 3 is mounted in a first end of the housing 1, and draws recirculating gas through the housing 2 on a recirculating gas side 33 of heat exchanger 5 along a recirculating gas flow path 24. The ambient air blower 4 is mounted in a second end of housing 1 and draws ambient air through the housing on an ambient air side 34 of heat exchanger 5 along an ambient air flow path 26. The heat exchanger 5 is mounted within the housing 2 intermediate the recirculating gas and ambient air blowers.

The recirculating gas requires the continuous removal of heat and ultimately cools the printed circuit boards that enter the product cooling chamber 13 of the reflow soldering oven. In the disclosed embodiment, the product cooling chamber is preferably located directly beneath the apparatus. The ambient air loop is designed to maintain heat exchanger surface temperature to affect controlled levels of forced convective product cooling.

The recirculating gas flowpath comprises a recirculating gas inlet 12, where recirculating gas is drawn into the recirculating gas side 33 of heat exchanger 5 from the product cooling chamber 13, through which printed circuit boards pass after they are heated in a main heating chamber (not shown) of the reflow soldering oven. When the recirculating gas enters the recirculating gas side of heat exchanger 5 it is flux laden since it has just passed over hot, printed circuit boards after they exit the main heating chamber of the reflow soldering oven. The recirculating gas entraps airborne flux that escapes from the main heating chamber and that is emitted by the printed circuit board assemblies as they are cooled. The recirculating gas then passes through the recirculating gas side of heat exchanger 5 and enters a recirculating gas exit plenum 14, where it is redirected to the product cooling chamber 13 via a plurality of recirculating gas nozzles 15. The recirculating gas nozzles 15 serve to distribute the recirculating gas evenly within the product cooling chamber 13. In order to prevent short-cycling of the heat exchanger, the apparatus includes a recirculating gas side sealing block 16, which seals the lower side of the heat exchanger in the area intermediate the recirculating gas inlet 12 and the recirculating gas exit plenum 14. Thus, the recirculating gas must pass through the heat exchanger 5.

The ambient air flowpath comprises an ambient air intake 20, where ambient air is drawn into the apparatus into ambient air side 34 of heat exchanger 5. The ambient air is then drawn through the ambient air inlet 10 and through the ambient air side of heat exchanger 5, by ambient air blower 4, which draws upon ambient air exit plenum 21. The ambient air is then exhausted to the atmosphere through ambient air outlet 22. Thus, the ambient air flowpath is part of an open system, while the recirculating gas flowpath defines a closed loop system. Like the recirculating gas side of the heat exchanger, the ambient air side comprises an ambient air sealing block 23, which prevents the ambient air from short cycling the heat exchanger 5.

In the preferred embodiment, both the recirculating gas sealing block 16 and the ambient air sealing block 23 are substantially triangular in shape and aid in orienting the heat exchanger 5 within the housing 2. The heat exchanger 5 is preferably oriented at an angle between about 0 degrees and about 30 degrees with respect to the plane of said housing. The preferred angle is 10 degrees.

Further, in the preferred embodiment the ambient air and the recirculating gas flow through the heat exchanger 5 in a counter flow manner. This results in a more efficient transfer of heat and a more even distribution of flux as it condenses on the heat exchanger surfaces, which prolongs the time between maintenance shutdowns during which the heat exchanger is removed from the apparatus and is cleaned.

The heat exchanger 5 is of the gas-to-gas variety, which means that the cooling medium and the medium being cooled pass through the heat exchanger in gaseous states. The heat exchanger 5 preferably comprises a single, pleated serpentine heat exchanger surface 30. When installed into the apparatus, the pleated serpentine heat transfer surface 30 coupled with first and second endplates 31 and 32 define a sealed barrier and common wall between the recirculating gas side 33 of the heat exchanger and the ambient air side 34 of the heat exchanger. The heat exchanger 5 is further oriented such that the pleats are vertically oriented and the recirculating gas side of the pleated surface opens to the bottom of the heat exchanger in a manner such that the heat exchanger can be said to be "bottomless" on its recirculating gas side 33. Thus, as flux laden recirculating gas enters the pleats of the heat exchanger and the recirculating gas comes in contact with the cool, vertically-oriented pleat surfaces, the flux that is entrapped in the recirculating gas condenses on the pleat surfaces and is able to flow under the influences of gravity to the open bottom of the heat exchanger to designated collection surfaces.

The heat exchanger incorporates wide pleat spacing to inhibit flux byproducts from clogging the flow path, which would reduce its efficiency and ultimately eliminate flow through the heat exchanger 5. In the worst case, flux byproducts could completely block the recirculating gas flowpath, which would eliminate the cooling of the printed circuit boards. The wide spacing between heat exchanger pleats is at least 0.25 inches and, in the preferred embodiment, is substantially about 0.6 inches.

The flux that drips out of the heat exchanger is caught in at least one drip collector plate 6 mounted beneath the heat exchanger 5. The drip collector plate 6 can either be a separate component or integrally mounted on the heat exchanger 5.

In either case, at regular maintenance intervals, the apparatus is shut down and the heat exchanger 5 and drip collector plate 6 can be removed for cleaning. In the preferred embodiment, a single apparatus will have at least one spare heat exchanger and drip collector plate so that when the apparatus is shut down for maintenance, the installed heat exchanger and drip plate can be removed and replaced with clean components. Then, the apparatus can be place back on line while the flux laden components are cleaned at another location using common chemical cleaning techniques, which are well know in the industry. This process of cleaning one set of components while a second set is in use by the apparatus will minimize downtime for maintenance purposes.

Both the recirculating gas blower 3 and ambient air blower 4 preferably incorporate separate and independent variable blower speed controls. These controls will allow control of cooling in several ways. First, by varying the speed of the ambient air blower, and maintaining the speed of the recirculating gas blower, cooling efficiency can be varied by varying the temperature maintained within the heat exchanger at a fixed recirculating gas flow rate. Second, by varying the speed of the recirculating gas blower, recirculating gas flow rate can be altered to increase or decrease cooling efficiency. Third, the speeds of both blowers can be varied simultaneously to simultaneously alter flow rates and cooling efficiency. Speed control may be accomplished manually or through the aid of a computer control system. If a computer control system is utilized, it will facilitate the monitoring of heat exchanger performance to establish and maintain desired cooling results while preserving a long-term database on actual performance conditions.

In another embodiment of the invention, a reflow soldering oven comprises a plurality of combination product cooling and flux management apparatuses, which are oriented in series, transversely across the product conveyor. In a further embodiment, the combination product cooling and flux management apparatus 1 comprises a plurality of heat exchangers 5 mounted in series within a single housing 2. In this embodiment the series-mounted heat exchangers would also be oriented transversely across the product conveyor.

Various changes coming within the spirit of the invention may suggest themselves to those skilled in the art; hence the invention is not limited to the specific embodiment shown or described, but the same is intended to be merely exemplary. It should be understood that numerous other modifications and embodiments can be devised by those skilled in the art that will fall within the spirit and scope of the principles of the invention.

What is claimed is:

1. A method of product cooling and flux management within a reflow soldering oven comprising the steps of:
   (a) drawing flux laden recirculating gas with a recirculating gas blower from a product cooling chamber of said reflow soldering oven through a recirculating gas side of a bottomless, pleated serpentine heat exchanger;
   (b) drawing ambient air with an ambient air blower through an ambient air side of said pleated, serpentine heat exchanger and exhausting said ambient air to atmosphere, such that said ambient air cools said flux laden recirculating gas via said heat exchanger, said heat exchanger defining a barrier and seal between said ambient air side and said recirculating gas side of said heat exchanger;
   (c) collecting condensed flux from said heat exchanger in at least one drip collector plate;
   (d) redirecting said recirculating gas to the product cooling chamber; and
   (e) repeating steps (a) through (d).

2. The method of product cooling and flux management within a reflow soldering oven of claim 1, further comprising the step of varying the speed of said ambient air blower.

3. The method of product cooling and flux management within a reflow soldering oven of claim 1, further comprising the step of varying the speed of said recirculating gas blower.

4. The method of product cooling and flux management within a reflow soldering oven of claim 1, further comprising the steps of:
   (a) removing said heat exchanger and said drip collector plate from said reflow soldering oven;
   (b) cleaning said heat exchanger and said drip collector plate; and
   (c) reinstalling said heat exchanger and said drip collector plate.

5. The method of product cooling and flux management within a reflow soldering oven of claim 1, further comprising the steps of:
   (a) removing said heat exchanger and said drip collector plate from said reflow soldering oven;
   (b) installing a spare heat exchanger and a spare drip collector plate into said reflow soldering oven;
   (c) cleaning said heat exchanger and said drip collector plate; and
   (d) storing said cleaned heat exchanger and said cleaned drip collector plate as the spare heat exchanger and the spare drip collector plate.

* * * * *